United States Patent [19]

Otsuka

[11] Patent Number: 5,461,603

[45] Date of Patent: Oct. 24, 1995

[54] DISC RECORDING/REPRODUCING APPARATUS HAVING TEMPERATURE CONTROL OF THE RECORDING/REPRODUCING PROCESSES

[75] Inventor: Satoshi Otsuka, Kanagawa, Japan

[73] Assignee: Sony Corporation, Tokyo, Japan

[21] Appl. No.: 230,111

[22] Filed: Apr. 20, 1994

[30] Foreign Application Priority Data

Apr. 22, 1993 [JP] Japan ................................. 5-095869

[51] Int. Cl.$^6$ ............................................ G11B 7/13
[52] U.S. Cl. ................. 369/120; 369/53; 369/54
[58] Field of Search ............................. 369/32, 120, 13, 369/53, 54, 47, 121; 360/31, 27

[56] References Cited

U.S. PATENT DOCUMENTS

| | | |
|---|---|---|
| 5,182,742 | 1/1993 | Ohmori et al. ................. 369/116 |
| 5,233,596 | 8/1993 | Tani ............................... 369/116 |
| 5,274,622 | 12/1993 | Kono .............................. 369/120 |
| 5,297,128 | 3/1994 | Yamaguchi et al. ............ 369/120 |
| 5,329,512 | 7/1994 | Fukimoto et al. .............. 369/121 |

FOREIGN PATENT DOCUMENTS 62-236173  10/1987  Japan .

*Primary Examiner*—Frank Gonzalez
*Assistant Examiner*—Tan Dinh

*Attorney, Agent, or Firm*—Limbach & Limbach; Philip M. Shaw, Jr.

[57] ABSTRACT

An apparatus which includes a recording or reproducing unit for recording or reproducing data on or from a disc, a data transmission/reception unit for transmitting playback data reproduced by the recording and reproducing unit from the disc to an external computer and receiving recording data supplied from the computer for supplying the received recording data to the recording and reproducing unit, a system controller for receiving a command supplied from the computer for controlling the data receiving unit, a temperature sensor for detecting the temperature within a main body of the disc recording and reproducing apparatus, and a recording/playback controller for controlling the operation of the recording and reproducing unit responsive to the command supplied from the computer via the system controller and a detection output of the temperature sensor. The recording/playback controller initially decides, when a command is supplied via the system controller from the computer, whether or not the temperature within the main body of the apparatus is outside a pre-set temperature range and inhibits the recording or reproducing operation when the temperature is outside the pre-set temperature range before starting the recording or reproducing operation. Further, if, during recording or reproducing it is detected that the temperature is outside of the pre-set temperature range, the recording/playback controller terminates the recording or reproducing operation after first recording or reproducing a pre-set amount of the recording or playback data, respectively, conforming to the command from the computer.

4 Claims, 2 Drawing Sheets

DISC RECORDING/REPRODUCING APPARATUS HAVING TEMPERATURE CONTROL OF THE RECORDING/REPRODUCING PROCESSES

DETAILED DESCRIPTION OF THE INVENTION

1. Field of the Invention

This invention relates to a disc recording apparatus, a disc reproducing apparatus and a disc recording/reproducing apparatus capable of recording/reproducing data on OF from a disc-shaped recording medium, such as a magneto-optical disc.

2. Description of the Prior Art

Our land is replete with a wide variety of the information, as the term information society implies. Thus the need was felt for a large-capacity recording medium capable of storing a large quantity of the information, and thus an optical disc has been developed. The optical disc may be enumerated by a compact disc (CD) recording the desired information in the form of pits and a magneto-optical disc recording the desired information on a photomagnetizable film on the disc using light and magnetism.

With the magneto-optical disc recording/reproducing apparatus, during recording of recording data supplied from a computer on the magneto-optical disc and reproducing the recorded data, the recording data is once written in a memory.

The recording data, written in the memory, is read on a sector basis, for example, so as to be supplied to a recording head.

The recording head produces a magnetic field associated with the recording data and applies the magnetic field so produced to the magneto-optical disc.

A recording laser beam of a high constant-level intensity is radiated on a site of the disc on which the magnetic field from the recording head is applied. The site of the photomagnetizable film of the magneto-optical disc, irradiated with the laser beam and thereby heated to the Curie temperature, loses its coercivity. Since the magnetic field from the recording head is applied to this site, the direction of magnetization is inverted for recording the recording data.

The recording data, thus recorded on the magneto-optical disc, is reproduced for each pre-set number of data as a unit by radiating a reproducing laser beam of a lower intensity from the laser diode. The recording data reproduced from the magneto-optical disc is written in the memory from which it is read out and routed to the computer.

The magneto-optical disc recording/reproducing apparatus is provided with a temperature sensor which detects the temperature within the magneto-optical disc recording/reproducing apparatus and transmits the temperature information to a system controller. When the temperature within the apparatus exceeds a pre-set temperature, the system controller generates the alarm information, controlling the memory and the laser diode for discontinuing the recording or reproducing operation even though the apparatus is recording or reproducing the data.

The fact that the alarm information is issued from the system controller represents the adverse situation in which correct recording data cannot be recorded or reproduced appropriately. Thus it is possible to prevent the incorrect recording/reproduction of the recording data from occurring by discontinuing the recording of reproduction whenever the alarm information is issued.

Such discontinuation of the recording or reproduction is made until the alarm information ceases to be produced by the system controller. Recording/reproduction is enabled when the alarm information ceases to be produced by the system controller.

However, the conventional magneto-optical disc recording/reproducing apparatus is designed to discontinue the recording/reproduction as soon as the alarm data is issued from the temperature sensor. Consequently, when the state of the discontinuation is released for re-starting the recording/reproduction of the recording data, it is necessary to record or reproduce the data from the outset, thus imposing an inconvenient operation

OBJECTS OF THE INVENTION

It is an object of the present invention to provide a disc recording apparatus, a disc reproducing apparatus and a disc recording/reproducing apparatus in which it is possible to avoid an inconvenience of re-starting-the data recording or reproduction from the outset when the alarm data is outputted from the temperature sensor, It is another object of the present invention to provide a disc recording apparatus and a disc recording/reproducing apparatus in which it is possible to prevent the recording data from being incorrectly recorded on the disc-shaped recording medium.

It is a further object of the present invention to provide a disc recording apparatus and a disc recording/reproducing apparatus in which it is possible to correctly record a series of recording data of a pre-set data quantity as designated by a recording command on the disc-shaped recording medium, It is a further object of the present invention to provide a disc reproducing apparatus and a disc recording/reproducing apparatus in which it is possible to prevent data from being incorrectly reproduced from the disc-shaped recording medium, It is a further object of the present invention to provide a disc reproducing apparatus and a disc recording/reproducing apparatus in which it is possible to correctly reproduce a series of playback data of a pre-set data quantity as designated by a playback command from the disc-shaped recording medium, It is yet another object of the present invention to provide a disc recording/reproducing apparatus in which it is possible to prevent destruction of the main body of the apparatus or data due to an abrupt rise in temperature in the main body of the apparatus.

SUMMARY OF THE INVENTION

With the disc recording apparatus according to the present invention, recording data supplied from outside via a data receiver is recorded by a recording unit on a disc-shaped recording medium by controlling the operation of the recording unit by a recording controller responsive to a control command supplied via a system controller from outside and a detection output of a temperature sensor, and by controlling the data receiver by a control command supplied from outside and received by the system controller. When the recording command is supplied from outside via the above system controller to the recording controller, the recording controller decides, based upon the detection output of the temperature sensor, whether or not the temperature within the main body of the apparatus is deviated from the pre-set temperature range. If the temperature is deviated from the above pre-set temperature range before starting the recording operation, the recording controller inhibits the recording operation conforming to the recording command. On the other hand, if the temperature has become deviated from the temperature range during the recording operation, the recording controller terminates the recording operation after recording the recording data of a pre-set quantity conforming to the recording command on the disc-shaped recording medium.

The disc recording apparatus according to the present invention comprises means for receiving recording data supplied from outside, a system controller for receiving a control command supplied from outside for controlling the data receiving means, means for recording the recording data supplied from outside via the data receiving means on a disc-shaped recording medium, a temperature sensor for detecting the temperature within a main body of the disc recording apparatus, and a recording controller for controlling the operation of the recording means responsive to the control command supplied from outside via the system controller and a detection output of the temperature sensor. When a recording command is supplied via the system controller from the outside, the recording controller decides, based on a detection output from the temperature sensor, whether or not the temperature within the main body of the apparatus is outside a pre-set temperature range, The recording controller inhibits the recording operation conforming to the recording command if the temperature is outside the pre-set temperature range before starting of the recording operation, while terminating the recording operation after recording a pre-set amount of the recording data conforming to the recording command on the disc-shaped recording medium if the temperature has become deviated outside the pre-set, range during the recording operation.

With the disc reproducing apparatus according to the present invention, a reproduction controlling unit controls the operation of the reproducing unit responsive to a control command supplied from outside via a system controller in order to control a data transmission unit. When the reproducing command is supplied from outside via the system controller, the reproduction control unit decides, based upon the detection output of the temperature sensor, whether or not the temperature within the main body of the apparatus is deviated outside the pre-set temperature range. If the temperature is deviated outside the pre-set range before starting the playback operation, the reproduction control unit inhibits the playback operation conforming to the reproducing command. On the other hand, if the temperature has become deviated outside the temperature range during the playback operation, the reproduction control unit terminates the playback operation after reproducing the playback data of the pre-set quantity conforming to the reproducing command from the disc-shaped recording medium and transmitting the data to outside.

In this manner, the disc reproducing apparatus according to the present invention prevents data from being incorrectly reproduced from the disc-shaped recording medium, while positively reproducing a series of playback data of a pre-set data quantity as designated by the reproducing command from the disc-shaped recording medium.

That is, the disc reproducing apparatus according to the present invention comprises means for reproducing data from a disc-shaped recording medium, means for transmitting playback data reproduced from the disc-shaped recording medium by the reproducing means to outside, a system controller for receiving a control command supplied from outside for controlling the data transmitting means, a temperature sensor for detecting the temperature within a main body of the disc reproducing apparatus, and a playback controller for controlling the operation of the reproducing means responsive to the control command supplied from outside via the system controller and a detection output of the temperature sensor. When a reproducing command is supplied via said system controller from outside, the playback controller decides, based on a detection output from the temperature sensor, whether or not the temperature within the main body of the apparatus is outside a pre-set temperature range. The playback controller inhibits the reproducing operation conforming to the reproducing command when the temperature is outside the pre-set temperature range before starting of the playback operation. The playback controller terminates the playback operation after reproducing a pre-set amount of the playback data conforming to the reproducing command from the disc-shaped recording medium if the temperature has become deviated outside the pre-set range during the playback operation.

Also, with the disc recording/reproducing apparatus according to the present invention, the recording/reproduction controller unit controls the operation of the recording/reproduction unit responsive to the control command supplied from outside via a system controller and a detection output of the temperature sensor and receives the control command supplied from outside by the system controller in order to control a data transmission/reception unit. On the other hand, the recording unit records the recording data supplied from outside via the data transmission/reception unit on the disc-shaped recording medium, and the data transmission/reception unit transmits to outside the playback data reproduced from the disc-shaped recording medium by the recording/reproducing unit. When fed with the recording/reproduction command form outside via the system controller, the recording/reproduction system controller decides, based on a detection output of the temperature sensor, whether or not the temperature within the main body of the apparatus is outside the pre-set temperature range. If the temperature is outside the temperature range, the recording/reproduction controller issues alarm data and inhibits the recording/reproducing operation conforming to the recording/reproduction command. If the temperature has become deviated outside the pre-set temperature range after the recording/reproducing operation is started responsive the recording/reproduction command, the recording/reproduction controller terminates the recording/reproducing operation after recording/reproducing a pre-set quantity of the recording/playback data conforming to the recording/reproduction command.

Thus the disc recording/reproducing apparatus according to the present invention prevents the recording data from being incorrectly recorded on the disc-shaped recording medium, and positively records a series of recording data of a pre-set data volume as designated by the recording command on the disc-shaped recording medium. Also the disc recording/reproducing apparatus prevents data from being incorrectly reproduced from the disc-shaped recording medium, and positively reproduces a series of recording data of a pre-set data volume as designated by the reproduction command from the disc-shaped recording medium.

Thus the disc recording/reproducing apparatus according to the present invention comprises means for recording/reproducing data on or from a disc-shaped recording medium, means for transmitting playback data reproduced by the recording/reproducing means from the disc-shaped recording medium to outside and receiving recording data supplied from outside for supplying the received recording data to the recording/reproducing means, a system controller for receiving a control command supplied from outside for controlling the data receiving means, a temperature sensor for detecting the temperature within a main body of the disc recording/reproducing apparatus, and a recording/playback controller for controlling the operation of the recording/reproducing means responsive to the control command supplied from outside via the system controller and a detection output of the temperature sensor, When a recording/reproducing command is supplied via said system controller from outside, the recording/playback controller decides, based on a detection output from the temperature sensor, whether or not the temperature within the main body of the apparatus is outside a pre-set temperature range. The recording/reproducing controller inhibits the recording/reproducing operation conforming to the recording/reproducing command when the temperature is outside the pre-set temperature range before starting the recording/reproducing operation. Also the recording/reproducing controller terminates the recording/reproducing operation after recording/reproducing a pre-set amount of the recording/playback data conforming to the recording/reproducing command on or from the disc-shaped recording medium when the temperature has become deviated outside the pre-set range after starting the recording/reproducing operation responsive to the recording/reproducing command.

In addition, the disc recording/reproducing apparatus according to the present invention issues the alarm information during recording for a wider temperature range than during reproduction in order to prevent destruction of data or the main body of the apparatus due to rapid rise in temperature in the main body of the apparatus.

That is, with the disc recording/reproducing apparatus according to the present invention, the temperature range within which the recording/reproducing means issues the alarm information during the recording operation is set so as to be wider than that during the reproducing operation.

DESCRIPTION OF THE PREFERRED EMBODIMENT

Figure 1:
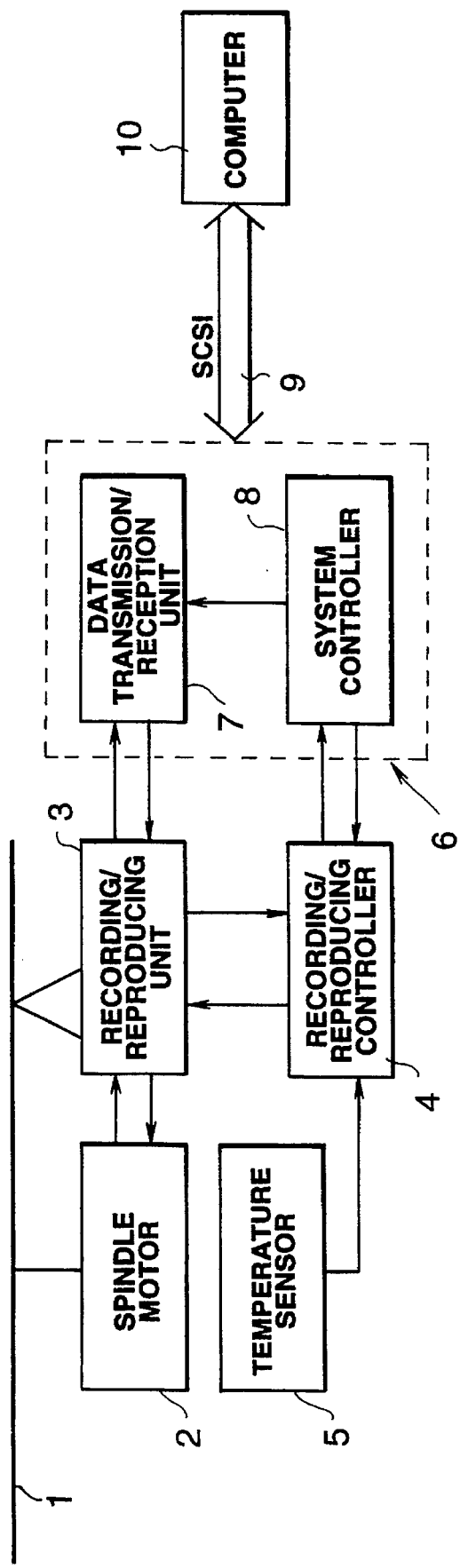
FIG. 1 is a block diagram showing an arrangement of the magneto-optical disc recording/reproducing apparatus according the present invention.

Referring to the drawings, a preferred embodiment of the present invention will be explained in detail.

The disc recording/reproducing apparatus according to the present invention is configured as shown for example in FIG. 1.

With the present embodiment, the present invention is applied to a magneto-optical disc recording/reproducing apparatus in which the desired recording information is recorded on or reproduced from the magneto-optical disc.

The magneto-optical disc recording/reproducing apparatus shown in FIG. 1 is made up of a spindle motor 2 rotationally driving the magneto-optical disc 1 at, for example, a constant angular velocity (CAV) or a constant linear velocity (CLV), a recording/reproducing unit 3 including an optical pickup comprised of a laser diode and a photodetector, a recording/reproduction controller 4 for controlling the recording/reproducing unit 3, a temperature sensor 5 for sensing the temperature within the apparatus, and a control circuit 6. The control circuit 6 is made up of a data transmission/reception unit 7 for exchanging the recording data with the recording/reproducing unit 3 and a system controller 8 for exchanging control data with the recording/reproduction controller 4.

The control circuit 6 of the magneto-optical disc recording/reproducing apparatus is connected over a busline 9 to a computer 10 which outputs the recording data and receives the playback data reproduced from the magneto-optical disc 1.

The data transmission/reception unit 7 is provided with a buffer memory which stores the recording data supplied from the computer 10 and the recording data reproduced from the magneto-optical disc 1.

Figure 2:
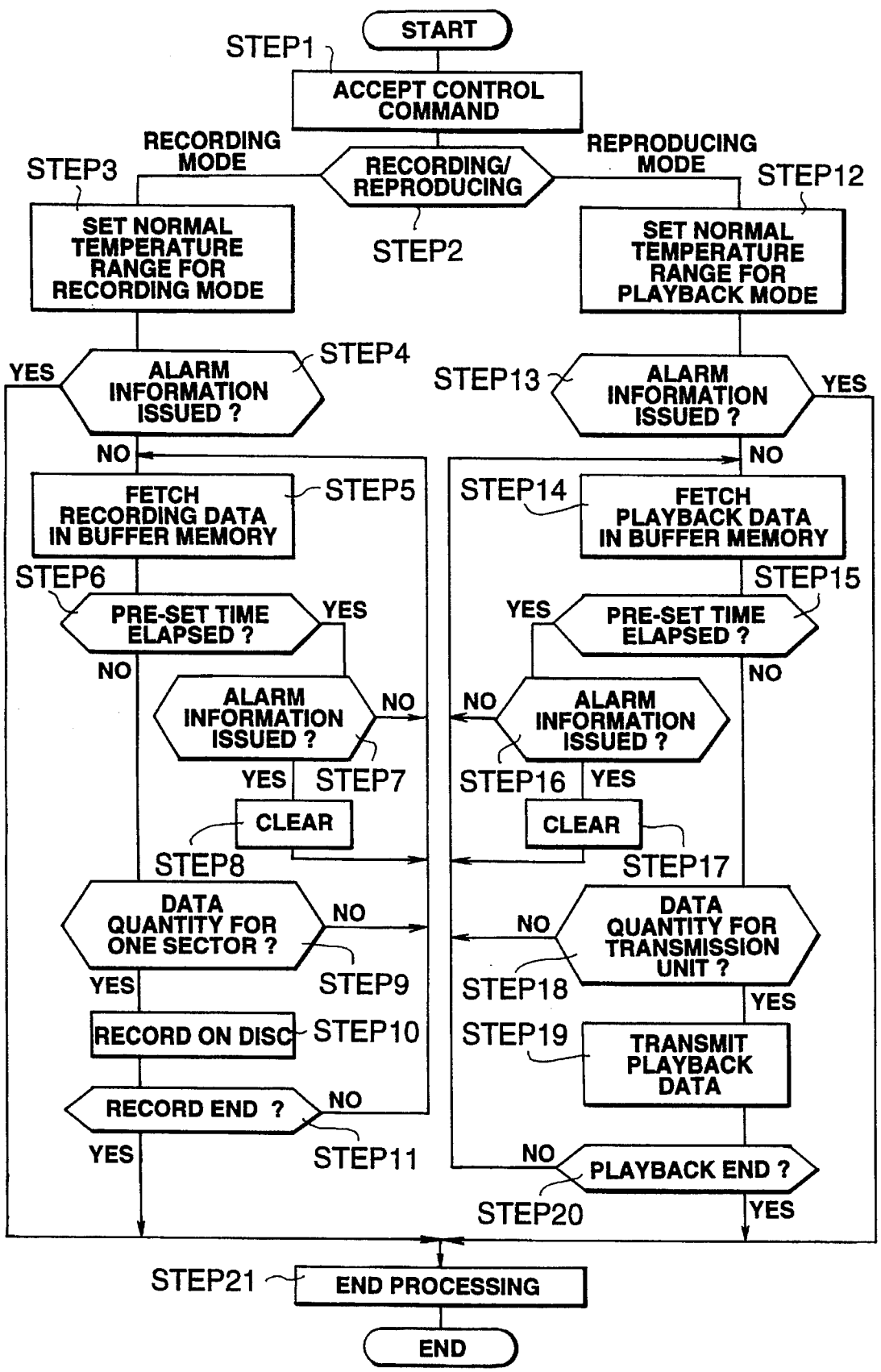
FIG. 2 is a flowchart for illustrating the operation of the magneto-optical disc recording/reproducing apparatus.

The operation of the above-described magneto-optical disc recording/reproducing apparatus is explained by referring to the flowchart of FIG. 2.

When the recording/reproducing controller 4 of the magneto-optical disc recording/reproducing apparatus accepts at a step 1 the control command supplied from the external computer 10 via the system controller 8, it deciphers at a step 2 if the control command is a recording command or a playback command.

If, as a result of the decision st the step 2, the accepted control command is the recording command, control proceeds to a step 3 for controlling the recording mode. If the control command is the playback command, control proceeds to a step 12 for controlling the playback command.

At the step 3, a temperature range of $-10°$ C. to $+65°$ C., for example, is set as a temperature range of not issuing the alarm information during the recording mode. At the next step 4, it is checked, based upon a detection output of the temperature sensor 5, whether or not the temperature in the main body of the apparatus is outside the normal temperature range of $-10°$ C. to $+66°$ C. If the result of check at the step 4 is YES, that is if the temperature in the main body of the apparatus is within the normal temperature range, control proceeds directly to the next step 5. If the result of check at the step 4 is NO, that is if the temperature in the main body of the apparatus is outside the normal temperature range, such that the temperature is lower than $-10°$ C. or higher than $+65°$ C., an alarm flag is set, and the alarm information is issued. Control proceeds to a terminating step 21 of supplying a status indicating the setting of the alarm flag to the computer 10 from the system controller 8 via the busline 9, terminating the processing responsive to the recording command.

That is, if, when the recording/reproducing control unit 4 accepts the recording command from the external computer 10, the temperature within the main body of the apparatus is outside the normal temperature range of $-10°$ C. to $+65°$ C., the recording/reproducing control unit 4 issues the alarm information and terminates the processing relevant to the recording operation without performing the recording operation. The recording/reproduction control unit 4 then is in a standby state.

In this manner, if, when the recording/reproducing control unit 4 accepts the recording command from the external computer 10, the temperature within the main body of the apparatus is outside the normal temperature range for the recording operation, the recording/reproduction control unit 4 inhibits the recording operation in order to prevent the recording data from being incorrectly recorded by the recording/reproducing unit 3 on the magneto-optical disc. On the other hand, since the status indicating the setting of the alarm flag is returned to the computer 10 responsive to the transmitted recording command, it is possible for the computer 10 to not transmit to the magneto-optical disc recording/reproducing apparatus the recording data susceptible to incorrect recording in order to assure reliable data control.

At the step 5, the system controller 8 is responsive to the recording command to control the data transmission/reception unit 7 in order to fetch the recording data supplied from the external computer 10 into the buffer memory of the data transmission/reception unit 7.

At the next step 6, it is checked whether or not a pre-set time interval has elapsed since it was last checked whether or not the temperature is within the normal temperature range within the main body of the apparatus.

If the result of the decision at the step 6 is YES, that is if the pre-set time has elapsed as from the time of the temperature range decision, control proceeds to a step 7 to make a second check as to whether or not the temperature in the main body of the apparatus is within the normal the temperature range. If the result of the decision at the step 6 is NO, that is if the pre-set time has not elapsed as from the time of the temperature range decision, control proceeds to a step 9.

If the result of decision at the step 7 is YES, that is if the temperature within the main body of the apparatus is within the normal range of temperature, control reverts to the step 5, continuing the fetching of the recording data into the buffer memory of the data transmission/reception unit 7. If the result of decision at the step 7 is NO, that is if the temperature within the main body of the apparatus is outside the normal range of temperature, control proceeds to a step 8, clearing the alarm flag. Control then reverts to the step 5, continuing the fetching of the recording data into the buffer memory of the data transmission/reception unit 7.

At the step 9, it is checked whether or not the recording data fetched at the step 5 into the buffer memory of the data transmission/reception unit 7 has reached the data volume corresponding to one sector. If the result of decision at the step 9 is YES, that is if there is one sector of recording data in the buffer memory of the data transmission/reception unit 7, control proceeds to a step 10. If the result of decision at the step 9 is not, that is if there is no one sector of recording data in the buffer memory of the data transmission/reception unit 7, control reverts to the step 5, continuing the fetching of the recording data into the buffer memory of the data transmission/reception unit 7.

At the step 10, the system controller 8 causes the data transmission/reception unit 7 to read the one sector of recording data from the buffer memory, and causes the recording/reproducing unit 3 to record the one sector of recording data on the magneto-optical disc 1.

During the recording mode, the recording/reproducing unit 3 radiates a recording laser beam of a high intensity from the laser diode to the magneto-optical disc 1. With the recording area of the magneto-optical disc 1 heated to the Curie temperature, the magnetic field conforming to the recording data is applied from the magnetic head to the recording area of the magneto-optical disc 1 for recording the recording data on the magneto-optical disc 1.

At the next step 11, it is checked whether or not a series of recording data of a pre-set volume as designated by the recording command has been recorded in their entirety.

If the result of the step 11 is NO, that is if there is any recording data left, control reverts to the step 5, continuing to fetch the recording data into the buffer memory of the data transmission/reception unit 7. If the result of decision at the step 11 is YES, that is if the series of recording data of a pre-set volume as designated by the recording command has been recorded in its entirety, control proceeds to the terminating step 21, returning the magnetic head and the optical pickup in the recording/reproducing unit 3 to their initial positions, while transmitting the status indicating the termination of recording of the series of the recording data supplied thereto to the computer 10 from the system controller 8 via the busline 9 for terminating the processing responsive to the recording command.

With the above-described magneto-optical disc recording/reproducing apparatus, if, after accepting the recording command from the external computer 10 and initiating at the step 5 the fetching of the recording data into the buffer memory of the data transmission/reception unit 7, the temperature within the main body of the apparatus is raised to outside the normal temperature range for the recording mode, the alarm flag is cleared at the step 8 and the recording data is continued to be fetched into the buffer memory of the data transmission/reception unit 7 in order to record the series of recording data of the pre-set data volume as commanded by the recording command on the magneto-optical disc 1 in their entirety. On the other hand, with the status indicating the termination of recording of the series of the recording data having been returned responsive to the transmitted recording command, the computer 10 is ready to control the recording data to be transmitted by the next recording command.

If, after the alarm flag is cleared at the step 8 and the recording data of the pre-set data volume as designated by the recording command is recorded, the next recording command is supplied, with the temperature in the main body of the apparatus being outside the normal temperature range for the recording mode, the magneto-optical disc recording/reproducing apparatus inhibits the recording operation based upon the results of decision at the step 4 in order to prevent the recording data from being incorrectly recorded on the magneto-optical disc 1 by the recording/reproducing unit 3. On the other hand, since the status indicating the setting of the alarm flag is returned to the computer 10 responsive to transmission of the recording command, it is possible for the computer 10 to not transmit to the magneto-optical disc recording/reproducing apparatus the recording data susceptible to incorrect recording for assuring more reliable data control.

With the present magneto-optical disc recording/reproducing apparatus, a temperature range of $-10°$ C. to $+69°$ C., for example, which is broader than that for the recording mode, is set at a step 12 as the normal temperature range for which the alarm information is not issued for the playback mode.

At the next step 13, it is checked, based upon the detection output of the temperature sensor 5, whether or not the temperature within the main body of the apparatus is outside the normal temperature range of $-10°$ C. to $+69°$ C. If the result of decision at the step 13 is YES, that is if the temperature within the main body of the apparatus is within the normal temperature range, control directly proceeds to the next step 14. If the result of decision at the step 13 is NO, that is if the temperature within the main body of the apparatus is outside the normal temperature range, such that the temperature is lower than $-10°$ C. or higher than $+69°$ C., an alarm flag is set and the alarm information is issued. Control then proceeds to the terminating step 21, performing a terminating operation of returning the optical pickup and the magnetic head within the recording/reproducing unit 3 to their initial positions and transmitting the status indicating the setting of the alarm flag from the system controller 8 over the busline 9 to the computer for terminating the processing responsive to the playback command.

That is, if, when the recording/reproducing control unit 4 accepts the playback command from the external computer 10, the temperature within the main body of the apparatus is outside the normal temperature range of −10° C. to +69° C., the recording/reproducing control unit 4 issues the alarm information and terminates the processing responsive to the reproducing operation without performing the reproducing operation. The recording/reproducing control unit 4 then is in a standby state.

In this manner, if, when the recording/reproducing control unit 4 accepts the reproducing command from the external computer 10, the temperature within the main body of the apparatus is outside the normal temperature range, the recording/reproducing control unit 4 inhibits the reproducing operation in order to prevent the recording data from being incorrectly reproduced by the recording/reproducing unit 3 from the magneto-optical disc. On the other hand, since the status indicating the setting of the alarm flag is returned to the computer 10 responsive to the transmitted reproducing command, it is possible for the computer 10 to not transmit to the magneto-optical disc recording/reproducing apparatus the reproducing data susceptible to incorrect reproduction in order to assure more reliable data control or management.

At the step 14, the recording/reproducing unit 3 and the data transmission/reception unit 7 are controlled responsive to the reproducing command in order to reproduce the data designated by the reproducing command from the magneto-optical disc 1 and in order to fetch the playback data into the buffer memory of the data transmission/reception unit 7.

It is noted that the recording/reproducing unit 3 radiates the readout laser beam of a smaller light volume during the playback mode to the magneto-optical disc 1 and detects the reflected light by the photodetector in order to reproduce data from the magneto-optical disc 1.

At the next step 15, it is checked whether or not the temperature is within the normal temperature range within the main body of the apparatus, after which it is checked whether or not a pre-set time interval has elapsed. If the result of the decision at the step 15 is YES, that is if the pre-set time has elapsed as from the time of temperature range decision, control proceeds to a step 16 to check whether or not the temperature in the main body of the apparatus is within the normal temperature range. If the result of the decision at the step 15 is NO, that is if the pre-set time has not elapsed as from the time of temperature range decision, control proceeds to a step 18.

If the result of decision at the step 16 is YES, that is if the temperature within the main body of the apparatus is within the normal range of temperature, control reverts to the step 14, continuing the fetching of the recording data into the buffer memory of the data transmission/reception unit 7. If the result of decision at the step 16 is NO, that is if the temperature within the main body of the apparatus is outside the normal range of temperature, control proceeds to a step 17, clearing the alarm flag. Control then reverts to the step 14, continuing the fetching of the recording data into the buffer memory of the data transmission/reception unit 7.

At the step 18, it is checked whether or not the recording data fetched at the step 14 into the buffer memory of the data transmission/reception unit 7 has reached the data volume corresponding to one sector. If the result of decision at the step 18 is YES, that is if there is the one sector of recording data in the buffer memory of the data transmission/reception unit 7, control proceeds to a step 19. If the result of decision at the step 18 is NO, that is if there is no one sector of recording data in the buffer memory of the data transmission/reception unit 7, control reverts to the step 14, continuing the fetching of the recording data into the buffer memory of the data transmission/reception unit 7.

At the step 19, the system controller 8 causes the data transmission/reception unit 7 to read one sector of playback data of a transmission unit from the buffer memory in order to transmit the read-out data from the data transmission/reception unit 7 over the busline 9 to the computer 10.

At the next step 20, it is checked whether or not the series of playback data of the pre-set data volume as designated by the reproducing command has been supplied in their entirety to the computer 10.

If the result of decision at the step 20 is NO, that is if there is any residual data, control reverts to the step 13, continuing to fetch the playback data into the buffer memory of the data transmission/reception unit 7. If the result of decision at the step 20 is YES, that is if the series of recording data of a pre-set volume as designated by the reproducing command has been reproduced and transmitted to the computer in their entirety, control proceeds to the terminating step 21, returning the magnetic head and the optical pickup in the recording/reproducing unit 3 to their initial positions. On the other hand, the status indicating the termination of recording of the series of the recording data is transmitted to the computer 10 from the system controller 8 via the busline 9 for terminating the processing responsive to the reproducing command.

With the above-described magneto-optical disc recording/reproducing apparatus, if, after accepting the reproducing command from the external computer 10 and initiating at the step 14 the fetching of the playback data into the buffer memory of the data transmission/reception unit 7, the temperature within the main body of the apparatus is raised to outside the normal temperature range for the playback mode, the alarm flag is cleared at the step 18 and the recording data is continued to be fetched into the buffer memory of the data transmission/reception unit 7 in order to reproduce the series of recording data of the pre-set data volume as commanded by the reproducing command on the magneto-optical disc 1. On the other hand, with the status indicating the termination of reproduction of the series of the recording data having been returned responsive to the transmitted reproducing command, the computer 10 is ready to control the recording data to be transmitted by the next control command.

With the above-described magneto-optical disc recording/reproducing apparatus, if, after the alarm flag is cleared at the step 17 and the playback data of the pre-set, data volume as designated by the reproducing command is reproduced, the next reproducing command is supplied, .with the temperature within the main body of the apparatus being outside the normal temperature range for the playback mode, the playback operation may be inhibited based upon the results of decision at the step 4 in order to prevent the data from being incorrectly reproduced. Also, if the status indicating that the alarm flag has been set is returned to the computer 10 responsive to the reproducing command, the playback data which might have been reproduced incorrectly may be prevented from being received from the magneto-optical disc recording/reproducing apparatus for assuring positive data control or management.

It is noted that, since the intensity of the laser light employed for reproduction is less than that used for recording during the recording mode, the rise in temperature within the main body of the apparatus is less likely to occur than during the recording mode, so that the reliable playback operation may be realized even although the normal temperature range is broader than that for the recording mode. In other words, since data recording is made with the laser light of a higher intensity, the temperature within the main body of the apparatus is likely to be raised abruptly, so that the normal temperature range needs to be set so as to be narrower than for the playback mode in order to prevent destruction of data or the main body of the apparatus otherwise caused by the rapid rise in temperature.

Although the present invention is applied in the above-described embodiments to the magneto-optical disc recording/reproducing apparatus, the present invention is not limited to this particular embodiment. Thus the present invention may be applied to the disc recording/reproducing apparatus employing a disc-shaped recording medium other than the magneto-optical disc, such as a magnetic disc or an optical disc. Likewise, the present invention may be applied to a disc recording apparatus having only the recording system, or a disc reproducing apparatus, having only the reproducing system.

What is claimed is:

1. A disc recording apparatus comprising:

data receiving means for receiving recording data supplied from an external device, a system controller for receiving a control command supplied from the external device for controlling said data receiving means, means for recording the recording data supplied from the external device via said data receiving means on a disc-shaped recording medium, a temperature sensor for detecting the temperature within a main body of the disc recording apparatus, and a recording controller for controlling the operation of the recording means responsive to the control command supplied from the external device via said system controller and a detection output of said temperature sensor, wherein said recording controller decides initially, when a recording command is supplied via said system controller from the external device, whether or not the temperature within the main body of the apparatus is outside a pre-set temperature range, based on a detection output from said temperature sensor, and inhibits the recording operation when the temperature is outside the pre-set temperature range before starting the recording operation, and further detects during the recording operation whether the temperature is outside the pre-set range and, if so, terminates the recording operation after recording a pre-set amount of the recording data conforming to the recording command on the disc-shaped recording medium.

2. A disc reproducing apparatus comprising:

reproducing means for reproducing data from a disc-shaped recording medium, data transmitting means for transmitting playback data reproduced from the disc-shaped recording medium by said reproducing means to an external device, a system controller for receiving a control command supplied from the external device for controlling said data transmitting means, a temperature sensor for detecting the temperature within a main body of the disc reproducing apparatus, and a playback controller for controlling the operation of the reproducing means responsive to the control command supplied from the external device via said system controller and a detection output of said temperature sensor, wherein said playback controller initially decides, when a reproducing command is supplied via said system controller from the external device, whether or not the temperature within the main body of the apparatus is outside a pre-set temperature range, based on a detection output from said temperature sensor, and inhibits the reproducing operation conforming to the reproducing command when the temperature is outside the pre-set temperature range before starting the playback operation, and further detects during the reproducing operation whether the temperature is outside the pre-set range and, if so, terminates the playback operation after reproducing a pre-set amount of the playback data conforming to the reproducing command from the disc-shaped recording medium.

3. A disc recording and reproducing apparatus comprising:

recording and reproducing means for recording and reproducing data on or from a disc-shaped recording medium, data transmitting and receiving means for transmitting playback data reproduced by said recording and reproducing means from the disc-shaped recording medium to an external device and receiving recording data supplied from the external device for supplying the received recording data to said recording and reproducing means, a system controller for receiving a control command supplied from the external device for controlling said data transmitting and receiving means, a temperature sensor for detecting the temperature within a main body of the disc recording and reproducing apparatus, and a recording/playback controller for controlling the operation of the recording and reproducing means responsive to the control command supplied from the external device via said system controller and a detection output of said temperature sensor, wherein said recording/playback controller initially decides, when a control command is supplied via said system controller from the external device, whether or not the temperature within the main body of the apparatus is outside a pre-set temperature range, based on a detection output from said temperature sensor, and inhibits any recording or reproducing operation conforming to the control command by generating an alarm information when the temperature is outside the pre-set temperature range before starting the recording or reproducing operation, and further detects during any recording or reproducing operation if the temperature is outside the pre-set range and, if so, terminates the recording or reproducing operation after recording or reproducing a pre-set amount of data conforming to the control command to or from, respectively, the disc-shaped recording medium after performing the recording or reproducing operation responsive to said control command.

4. The disc recording and reproducing apparatus as claimed in claim 3 wherein the temperature range within which the recording/playback controller issues the alarm information during the recording operation is set so as to be wider than that during the reproducing operation.

* * * * *